United States Patent
Ellefson et al.

(10) Patent No.: US 6,476,612 B1
(45) Date of Patent: Nov. 5, 2002

(54) LOUVERED BEAM STOP FOR LOWERING X-RAY LIMIT OF A TOTAL PRESSURE GAUGE

(75) Inventors: Robert E. Ellefson, Manlius, NY (US); Louis C. Frees, Manlius, NY (US)

(73) Assignee: Inficon Inc., East Syracuse, NY (US)

( * ) Notice: Subject to any disclaimer, the term of this patent is extended or adjusted under 35 U.S.C. 154(b) by 0 days.

(21) Appl. No.: 09/838,402

(22) Filed: Apr. 19, 2001

(51) Int. Cl.[7] .................... G01L 21/30; H01J 49/00
(52) U.S. Cl. ........................ 324/460; 250/281
(58) Field of Search .................. 324/460, 462, 324/463, 459; 250/281, 286, 282, 287, 288

(56) References Cited

U.S. PATENT DOCUMENTS

| | | | | |
|---|---|---|---|---|
| 4,611,118 A | * | 9/1986 | Managadze | 250/281 |
| 5,889,281 A | * | 3/1999 | Holkeboer et al. | 250/282 |
| 6,091,068 A | * | 7/2000 | Parfitt et al. | 250/281 |

* cited by examiner

Primary Examiner—N. Le
Assistant Examiner—James Kerveros
(74) Attorney, Agent, or Firm—Wall Marjama & Bilinski LLP

(57) ABSTRACT

In an ionization gauge, the effect of X-rays emitted when a collimated electron beam strikes grid surfaces in the gauge structure is reduced by a louvered beam stop. The louvered beam stop creates shadow regions having no X-rays, thus minimizing the amount of X-rays striking the collector plate and reducing the X-ray effect portion of the residual current.

10 Claims, 2 Drawing Sheets

LOUVERED BEAM STOP FOR LOWERING X-RAY LIMIT OF A TOTAL PRESSURE GAUGE

FIELD OF THE INVENTION

This invention pertains to the field of ionizing gas samples for analysis, and in particular to reducing the residual current in an ionization gauge or mass spectrometer ion source due to the X-ray effect by using a louvered electron beam stop.

BACKGROUND OF THE INVENTION

The low pressure measurement limit of total pressure gauges is largely limited by the generation of x-rays when electrons strike grid surfaces in the gauge structure. The x-rays generated have an angular distribution of intensities leaving the surface with a maximum intensity near the normal. Some of these energetic photons can strike the total pressure collector and eject an electron from the ion collector. This loss of an electron is indistinguishable from the arrival of a positive ion at the collector. Thus, the photoelectron ejection is recorded as an ion current which at very low pressures produces an "X-ray limit" for low pressure for any gauge. This X-ray limit is particularly high for the triode type of ion gauge where the collector surface is a cylinder around the central filament and grid. Prior art in minimizing this problem includes:

1. Making the total pressure collector a very fine wire to minimize the area for x-ray absorption (the Bayard-Alpert Ion Gauge - (BAG), 2. Modulating the ion collection to reject photoelectron effects (Modulated BAG), 3. Extracting the ions formed in a gauge through an aperture to a separate collection region using a modulated ion repeller (The Extractor Gauge of Redhead, et al.), and 4. Extracting the ions and bending them with an electrostatic analyzer to an ion collector (The Helmer Gauge).

All of these gauges focus on minimizing the incidence of the x-rays present in a standard cylindrical grid structure by designing a particular size and location of the collector element or modulating the ion collection process.

SUMMARY OF THE INVENTION

Briefly stated, in an ionization gauge, the effect of X-rays emitted when a collimated electron beam strikes grid surfaces in the gauge structure is reduced by a louvered beam stop. The louvered beam stop creates shadow regions having no X-rays, thus minimizing the amount of X-rays striking the collector plate and reducing the X-ray effect portion of the residual current.

According to an embodiment of the invention, in an ionization gauge having an electron beam shaped by an anode, in which gas molecules are ionized by the electron beam for analysis, and a beam stop which collects substantially all electrons in the electron beam not interacting with the gas molecules, the beam stop includes at least one louver on the beam stop.

According to an embodiment of the invention, an apparatus for determining a total ion pressure of a gas includes an ionization chamber; the ionization chamber having first and second ionization regions, wherein a boundary between the regions is defined by an anode grid or aperture; means for producing an electron beam passing through the first and second ionization regions, whereby an interaction between the electron beam and molecules of the gas within the ionization chamber produce first and second ion streams from a same gas density; an electron beam stop which collects substantially all electrons not interacting with the gas molecules, the electron beam stop including at least one louver; means for directing the first ion stream to an analyzer; and means for directing the second ion stream to an ion collector.

According to an embodiment of the invention, a method for determining a total ion pressure of a gas includes (a) providing an ionization chamber, the ionization chamber having first and second ionization regions, wherein a boundary between the regions is defined by an anode grid or aperture; (b) producing an electron beam passing through the first and second ionization regions, whereby an interaction between the electron beam and molecules of the gas within the ionization chamber produce first and second ion streams from a same gas density; (c) using an electron beam stop which collects substantially all electrons not interacting with the gas molecules, the electron beam stop including at least one louver; (d) directing the first ion stream to an analyzer; and (e) directing the second ion stream to an ion collector.

According to an embodiment of the invention, a method for reducing a residual current in an ionization gauge includes (a) providing an ionization chamber containing gas molecules of a gas to be analyzed; (b) producing an electron beam passing through the ionization chamber, whereby an interaction between the electron beam and the gas molecules within the ionization chamber produce at least one ion stream; (c) directing at least a portion of the ion stream to an ion collector; and (d) using an electron beam stop which collects substantially all electrons not interacting with the gas molecules, the electron beam stop including at least one louver, wherein the at least one louver directs a plurality of X-rays formed by the electrons interacting with the electron beam stop away from the ion collector.

DETAILED DESCRIPTION OF THE PREFERRED EMBODIMENT

Figure 1:
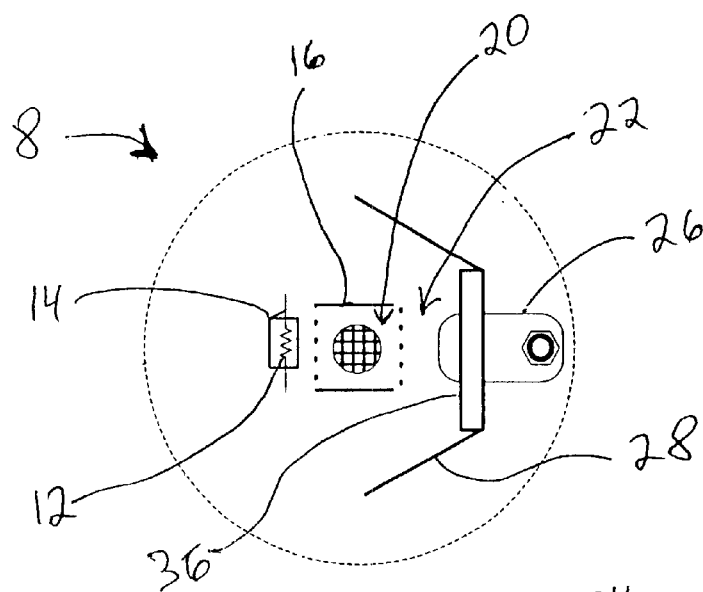
FIG. 1 shows a cross-sectional view of a portion of an ionization gauge according to an embodiment of the present invention.
Figure 2:
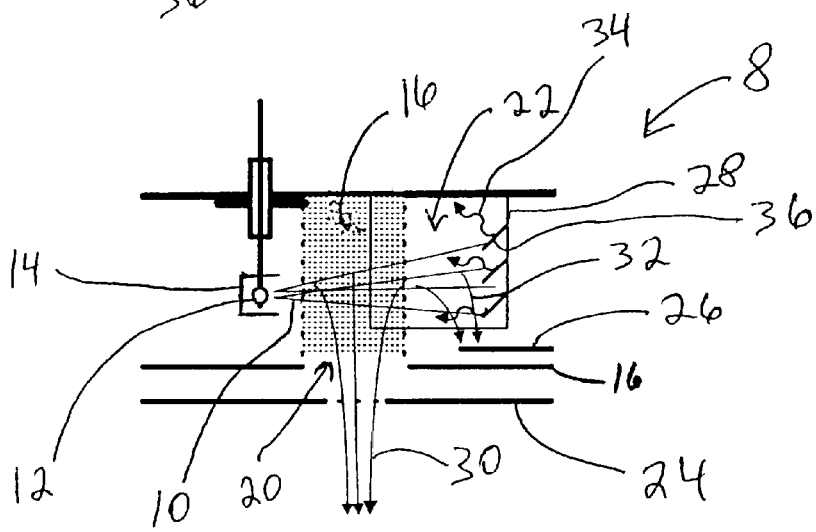
FIG. 2 shows a side view of a portion of the ionization gauge of FIG. 1.

Referring to FIGS. 1–2, an ionization gauge 8 is shown in which an electron beam 10 is emitted from a filament 12. The electrons in electron beam 10 are focused by a three-sided repeller 14 which is mounted such that a center of filament 12 is preferably at the center of diagonals drawn from the corners of repeller 14. Repeller 14 is connected to the negative side of filament 12, thus making repeller 14 more negative than the potential of emitted electrons by an amount equal to the filament voltage with respect to the negative lead at the point the electron is emitted. This is approximately one-half the voltage across the filament (~1.5 V).

The electrons in electron beam 10 are drawn to an anode 16, preferably a square anode, by a voltage that is positive with respect to filament 12. Anode 16 is preferably biased at 70 V. Anode 16 separates a first region (partial pressure) 20 from a second region (total pressure) 22. Electron beam 10 forms ions in both the first and second regions 20, 22. A plurality of ions 30 from first region 20 are extracted by a focus lens 24 and directed to a mass analysis device (not shown), where they form ion currents proportional to pressures of gas components in region 20. A plurality of ions 32 from second region 22 are collected by an ion collection device, such as a collector plate 26, to produce a current proportional to the total pressure of gas components in second region 22.

The electrons in electron beam 10 continue through first and second regions 20, 22 and impact on a beam stop 28. Anode 16 and beam stop 28 together function as an anode for electron beam 10, resulting in the acceleration of electrons in electron beam 10 being perpendicular to the equipotential lines established by the structure, thus resulting in a focused beam.

When electrons traverse first and second regions 20, 22, they have a typical energy of 70 eV. When these electrons strike beam stop 28, some of the energy can generate electromagnetic radiation in the form of X-rays 34. These X-rays 34 have a cosine squared distribution of intensities leaving the surface. If some of these energetic photons strike collector plate 26, an electron is emitted from collector plate 26. Because this loss of an electron is indistinguishable from the arrival of an ion, the event is recorded as ion current, which at very low pressures, produces an "X-ray limit" at low pressures for any gauge.

In our invention for minimizing the low pressure x-ray limit, we focus on controlling the direction that X-rays 34 are emitted when collimated electron beam 10 strikes electron beam stop 28. The ion collector element, collector plate 26, is placed in the shadow of x-rays 34 and thus minimizes the x-ray current. At least one louver, and preferably a plurality of louvers, 36 in beam stop 28 controls the direction of the emitted X-rays 34. Louvers 36 preferably are in the portion of beam stop 28 that is approximately +/−20 degrees from the central axis of electron beam 10. The angle of louvers 36 is preferably 30–45 degrees from the vertical plane of beam stop 28 as shown in FIG. 2. Louvers 36 are preferably angled plates affixed to a back plate 37.

When electron beam 10 strikes louvered beam stop 28, X-rays 34 are produced whose energy is less than the electron energy and whose angle of emission from the surface of louvers 36 of beam stop 28 is a cosine-squared distribution about an axis normal to each louver 36. This design minimizes the number of X-rays emitted parallel to louvers 36, thus creating a shadowed region with no x-rays behind each plate and behind a line extending parallel to each angled plate. Collectively the effect is to minimize x-rays striking the collector plate 26. The dimensions of collector plate 26 are designed to be in the shadowed region and yet create the necessary field to efficiently attract and collect ions.

Figure 3:
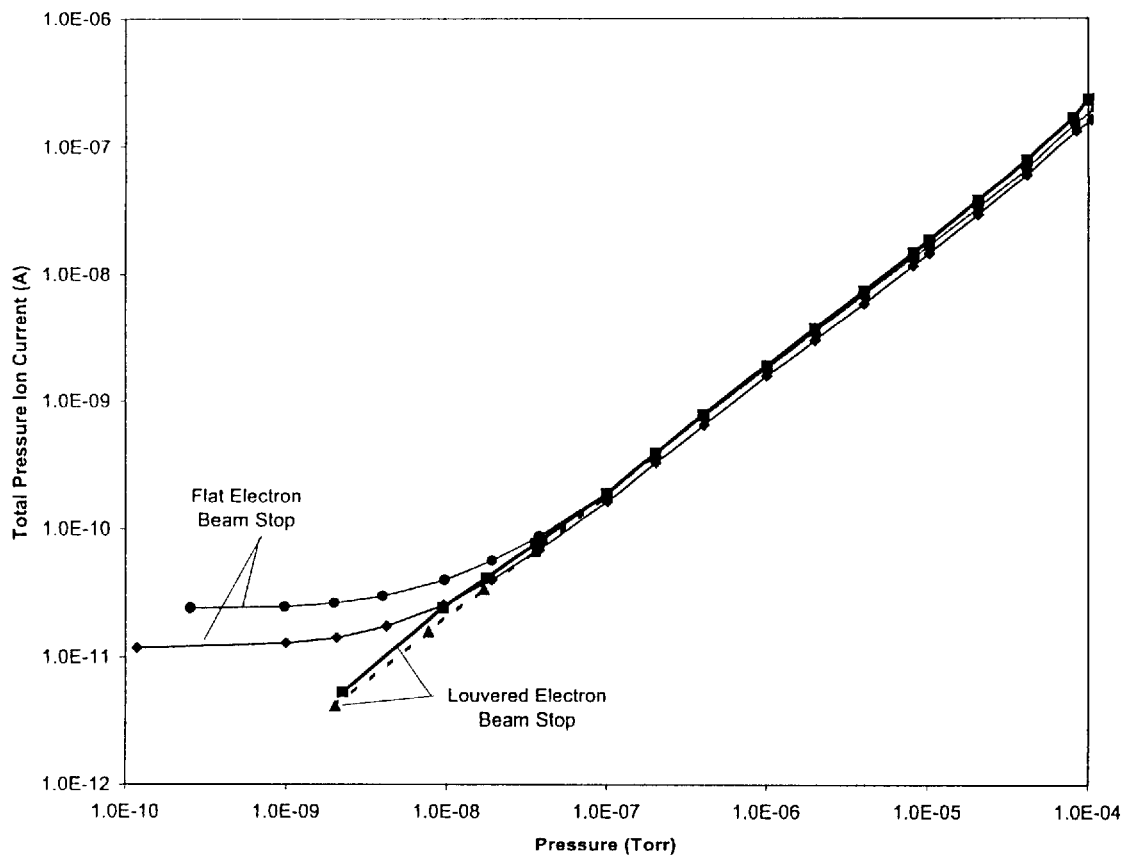
FIG. 3 shows a total pressure ion current measured with a flat electron beam stop of the prior art compared with a total pressure ion current measured with a louvered electron beam stop of the present invention.

Referring to FIG. 3, the ion current measured vs pressure for the total pressure collector with a flat beam stop is shown. Note that below 2E-8 Torr the output ion current is constant at 1E-10 A. Also shown in FIG. 3 is the ion current vs pressure for the louvered beam stop of the present invention. The extension of a linear response to the ion current is clearly shown.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. In an ionization gauge having an electron beam shaped by a repeller and an anode, in which gas molecules are ionized by said electron beam for analysis, and a beam stop which collects substantially all electrons in said electron beam not interacting with said gas molecules, said beam stop comprising at least one louver on said beam stop.

2. A beam stop according to claim 1, wherein said at least one louver is only on a central portion of said beam stop.

3. A beam stop according to claim 1, wherein said at least one louver is angled between 30 and 45 degrees from a vertical plane of said beam stop, said vertical plane being substantially perpendicular to a longitudinal axis of said electron beam.

4. An apparatus for determining a total pressure of a gas, comprising:
   an ionization chamber;
   said ionization chamber having first and second ionization regions, wherein a boundary between said regions is defined by one of an aperture and an anode grid;
   means for producing an electron beam passing through said first and second ionization regions, whereby an interaction between said electron beam and molecules of said gas within said ionization chamber produce first and second ion streams from a same gas density;
   an electron beam stop which collects substantially all electrons not interacting with said gas molecules, said electron beam stop including at least one louver;
   means for directing said first ion stream to an analyzer; and
   means for directing said second ion stream to an ion collector.

5. An apparatus according to claim 4, further comprising:
   means for collecting said first ion stream at said ion collector;
   means for measuring a reference current produced by said second ion stream at said ion collector; and
   means, using said reference current, for calculating said total pressure of said gas within said ionization chamber.

6. An apparatus according to claim 4, wherein said at least one louver is only on a central portion of said beam stop.

7. An apparatus according to claim 6, wherein said at least one louver is angled between 30 and 45 degrees from a vertical plane of said beam stop, said vertical plane being substantially perpendicular to a longitudinal axis of said electron beam.

8. An apparatus according to claim 4, wherein said plurality of louvers are angled between 30 and 45 degrees from a vertical plane of said beam stop, said vertical plane being substantially perpendicular to a longitudinal axis of said electron beam.

9. A method for determining a total ion pressure of a gas, comprising the steps of:
   providing an ionization chamber, said ionization chamber having first and second ionization regions, wherein a boundary between said regions is defined by one of an aperture and an anode grid;
   producing an electron beam passing through said first and second ionization regions, whereby an interaction between said electron beam and molecules of said gas within said ionization chamber produce first and second ion streams from a same gas density;

using an electron beam stop which collects substantially all electrons not interacting with said gas molecules, said electron beam stop including at least one louver;

directing said first ion stream to an analyzer; and directing said second ion stream to an ion collector.

10. A method for reducing a residual current in an ionization gauge, comprising the steps of:

providing an ionization chamber containing gas molecules of a gas to be analyzed;

producing an electron beam passing through said ionization chamber, whereby an interaction between said electron beam and said gas molecules within said ionization chamber produce at least one ion stream;

directing at least a portion of said ion stream to an ion collector; and using an electron beam stop which collects substantially all electrons not interacting with said gas molecules, said electron beam stop including at least one louver, wherein said at least one louver directs a plurality of X-rays formed by said electrons interacting with said electron beam stop away from said ion collector.

* * * * *